(12) United States Patent
Terry

(10) Patent No.: US 12,447,621 B2
(45) Date of Patent: Oct. 21, 2025

(54) ROBOTIC IMAGING SYSTEM WITH VELOCITY-BASED COLLISION AVOIDANCE MODE

(71) Applicant: Alcon Inc., Fribourg (CH)

(72) Inventor: Patrick Terry, Goleta, CA (US)

(73) Assignee: Alcon Inc., Fribourg (CH)

( * ) Notice: Subject to any disclaimer, the term of this patent is extended or adjusted under 35 U.S.C. 154(b) by 311 days.

(21) Appl. No.: 18/112,599

(22) Filed: Feb. 22, 2023

(65) Prior Publication Data
US 2023/0278218 A1  Sep. 7, 2023

Related U.S. Application Data

(60) Provisional application No. 63/315,130, filed on Mar. 1, 2022.

(51) Int. Cl.
*B25J 9/16* (2006.01)
*A61B 34/30* (2016.01)

(52) U.S. Cl.
CPC .......... *B25J 9/1676* (2013.01); *B25J 9/1666* (2013.01); *B25J 9/1682* (2013.01); *B25J 9/1697* (2013.01); *A61B 34/30* (2016.02); *G05B 2219/40504* (2013.01)

(58) Field of Classification Search
CPC ...... B25J 9/1676; B25J 9/1682; B25J 9/1666; B25J 9/1697; B25J 9/041; B25J 9/045; A61B 34/30; G05B 2219/40504; G05B 2219/2617; G05B 2219/21129; G06T 2207/30004; G06T 2207/30041
See application file for complete search history.

(56) References Cited

U.S. PATENT DOCUMENTS

| | | | |
|---|---|---|---|
| 10,917,543 B2* | 2/2021 | Ramirez Luna | B25J 9/0009 |
| 11,751,948 B2* | 9/2023 | Gregerson | B25J 9/1666 606/185 |
| 2019/0327394 A1 | 10/2019 | Ramirez Luna et al. | |
| 2020/0078097 A1 | 3/2020 | Gregerson et al. | |

FOREIGN PATENT DOCUMENTS

| | | | | |
|---|---|---|---|---|
| CN | 106292287 A | * | 1/2017 | G05B 13/042 |
| JP | 2006242031 A | * | 9/2006 | |
| WO | 2014139023 A1 | | 9/2014 | |

* cited by examiner

*Primary Examiner* — Ramon A. Mercado
*Assistant Examiner* — Noah W Stiebritz
(74) *Attorney, Agent, or Firm* — Nayyer J. Siddiqi; Quinn IP Law

(57) ABSTRACT

A robotic imaging system includes a camera configured to obtain one or more images of a target site. A robotic arm is operatively connected to the camera, the robotic arm being adapted to selectively move the camera in a movement sequence. The robotic imaging system includes a sensor configured to detect and transmit sensor data related to a respective position and/or a respective speed of the camera. A controller is configured to receive the sensor data, the controller having a processor and tangible, non-transitory memory on which instructions are recorded. The controller is adapted to selectively execute a collision avoidance mode, which includes determining a trajectory scaling factor for the camera. The trajectory scaling factor is applied to modulate the respective speed when the camera and/or the robotic arm are in a predefined buffer zone.

18 Claims, 5 Drawing Sheets

ROBOTIC IMAGING SYSTEM WITH VELOCITY-BASED COLLISION AVOIDANCE MODE

CROSS-REFERENCE TO RELATED APPLICATION

The present application claims the benefit of priority to U.S. Provisional Application No. 63/315,130 filed Mar. 1, 2022, which is hereby incorporated by reference in its entirety.

INTRODUCTION

The present disclosure relates generally to a robotic imaging system. More specifically, the disclosure relates to a collision avoidance mode in a robotic imaging system. Various imaging modalities are commonly employed to image different parts of the human body. Robotic systems have been developed to improve the efficiency of medical procedures employing these imaging modalities. The robotic systems may incorporate multiple parts or components to assist users in operating the system. As such, it may be challenging to avoid self-collisions of the multiple components, for example, one robot link with another, collisions of the camera unit with the robotic arm and/or storage unit, and collisions of the camera unit with the image plane.

SUMMARY

Disclosed herein is a robotic imaging system having a camera configured to obtain one or more images of a target site. A robotic arm is operatively connected to the camera, the robotic arm being adapted to selectively move the camera in a movement sequence. The robotic imaging system includes a sensor configured to detect and transmit sensor data related to a respective position and/or a respective speed of the camera. A controller is configured to receive the sensor data, the controller having a processor and tangible, non-transitory memory on which instructions are recorded. The controller is adapted to selectively execute a collision avoidance mode, which includes determining a trajectory scaling factor for the camera. The trajectory scaling factor is applied to modulate the respective speed when at least one of the camera and the robotic arm is in a predefined buffer zone.

The camera may be a stereoscopic camera configured to record left and right images for producing at least one stereoscopic image of the target site. In some embodiments, the predefined buffer zone is within a delta value of at least one keep-out zone, application of the trajectory scaling factor pushing the camera away from the at least one keep-out zone. The robotic imaging system may include a head unit for housing the camera, a coupling plate mechanically coupling the head unit to the robotic arm, the head unit being operatively connected to a cart. The controller is adapted to calculate the trajectory scaling factor for a set of checkpoints located on the head unit, the robotic arm and/or the coupling plate. The set of checkpoints each have a respective position along a first direction and a respective velocity along the first direction.

The controller may be adapted to initialize the trajectory scaling factor to a normalized value when the robotic arm and/or the camera is outside of the predefined buffer zone, the trajectory scaling factor being based on multiple limit calculations. The controller is adapted to obtain a minimum value of a plurality of local scales respectively obtained from the multiple limit calculations, with the trajectory scaling factor being chosen as a lower one of the normalized value and the minimum value of the plurality of local scales. The multiple limit calculations each employ respective linear functions raised to a predetermined scale power between about 1 and about 2, inclusive.

The trajectory scaling factor may be based on multiple limit calculations, including a joint avoidance calculation. The plurality of joints defines respective joint angles therebetween. The controller is adapted to execute the joint avoidance calculation by checking a distance and speed of the respective joint angles of the robotic arm against respective fixed joint angle limits.

The robotic imaging system may include a cart operatively connected to the camera. The trajectory scaling factor may be based on multiple limit calculations, including a cart avoidance calculation. The controller is adapted to execute the cart avoidance calculation for a set of checkpoints located on the camera, including checking the respective speed and distance of the set of checkpoints against a surface of the cart. The surface of the cart may be modelled as a sphere. The trajectory scaling factor may be based on multiple limit calculations, including a boundary plane avoidance calculation. The controller is adapted to execute the boundary plane avoidance calculation for a set of checkpoints located on the camera, including checking the respective speed and distance of a set of checkpoints against at least one predefined boundary plane.

The robotic imaging system may include an orbital scan mode executable by the controller to enable the robotic arm to sweep an orbital trajectory at least partially circumferentially around the target site. Executing the collision avoidance mode includes generating an adjusted orbital trajectory based in part on the trajectory scaling factor, the adjusted orbital trajectory being defined in a spherical coordinate axis defining a first spherical angle and a second spherical angle. The target site includes an or a *serrata* of an eye. The robotic imaging system may include a low-pass filter selectively executable by the controller to smooth changes in the second spherical angle in each cycle. The robotic imaging system may include saturation function is selectively executable by the controller, the saturation function limiting a magnitude of the second spherical angle to be within 0 and 90 degrees in each cycle, inclusive.

The controller may be adapted to change a view angle of the orbital trajectory by keeping the first spherical angle constant while iterating the second spherical angle until a desired viewing angle is reached. The controller is adapted to selectively command the orbital trajectory by iterating the first spherical angle between a predefined starting angle and a predefined ending angle while the second spherical angle is at the desired viewing angle. The controller is adapted to generate the adjusted orbital trajectory from the orbital trajectory via a limiting feedback term and a resetting feedback term. The limiting feedback term causes a cycle radius in the adjusted orbital trajectory to decrease while near a joint limit, the resetting feedback term causing the cycle radius in the adjusted orbital trajectory to reset back when the joint limit has been cleared.

The limiting feedback term is based on the trajectory scaling factor, a time derivative of the trajectory scaling factor, a first proportional gain constant and a first derivative gain constant. The limiting feedback term ($R_{limit}$) may be obtained as: $R_{limit}=[K_{p1}(1.0-SF)-K_{d1}(\dot{SF})]$, such that SF denotes the trajectory scaling factor, $\dot{SF}$ denotes the time derivative of the trajectory scaling factor, $K_{p1}$ denotes the first proportional gain constant and $K_{d1}$ denotes the first derivative gain constant. The resetting feedback term is based on a cycle radius corresponding to the second spherical angle, a time derivative of the cycle radius, a nominal radius corresponding to a desired viewing angle, a second proportional gain constant and a second derivative gain constant. The resetting feedback term ($R_{reset}$) is obtained as: $R_{reset}=[K_{p2}(R_0-R)-K_{d2}(\dot{R})]$, such that R denotes the cycle radius, $R_0$ denotes the nominal radius, $\dot{R}$ denotes the time derivative of the cycle radius, $K_{p2}$ denotes the second proportional gain constant and $K_{d2}$ denotes the second derivative gain constant.

The above features and advantages and other features and advantages of the present disclosure are readily apparent from the following detailed description of the best modes for carrying out the disclosure when taken in connection with the accompanying drawings.

Figure 1:
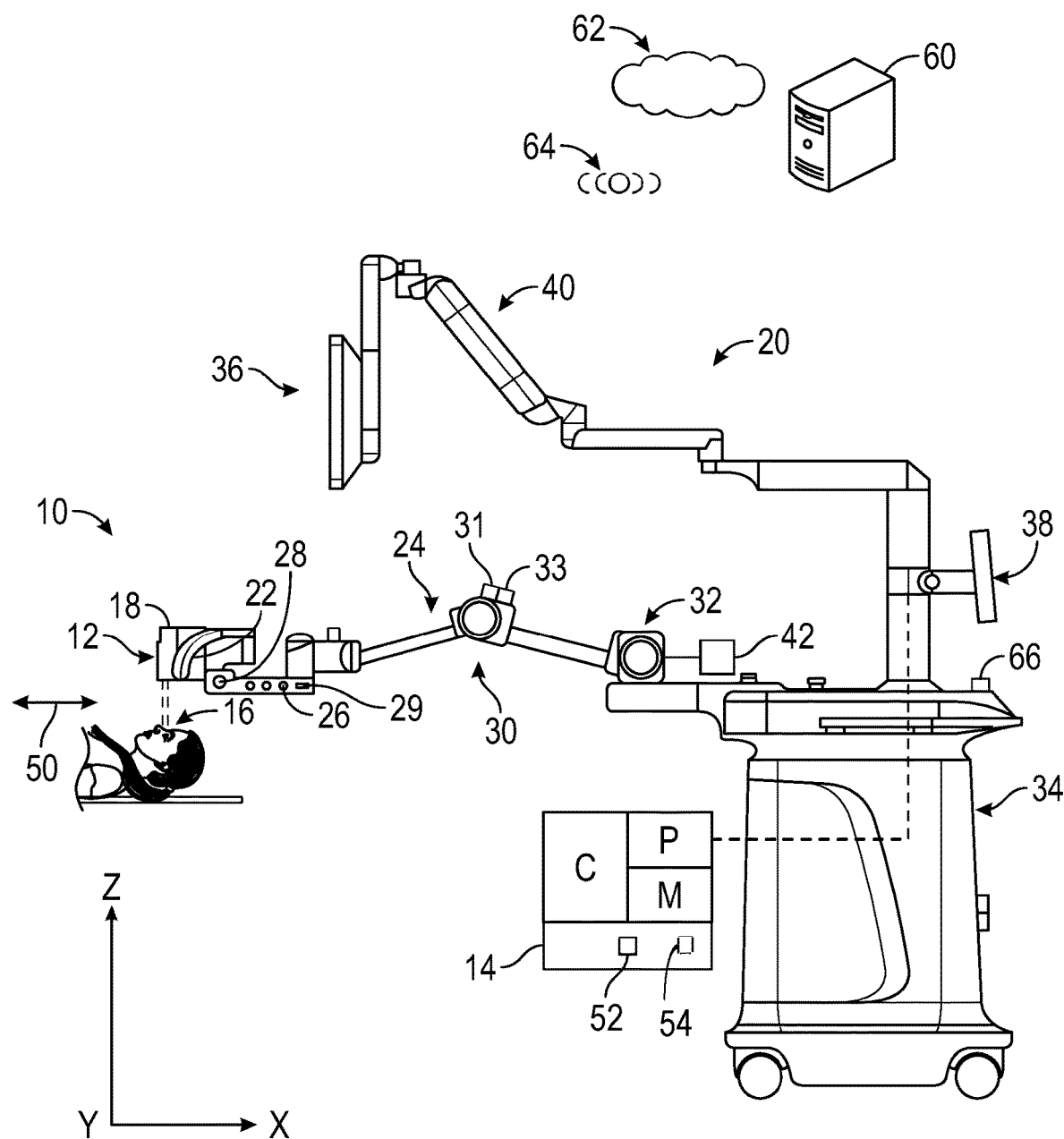
FIG. 1 is a schematic fragmentary diagram of a robotic imaging system having a camera, and a controller with a collision avoidance mode.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a robotic imaging system 10 having a camera 12 with a collision avoidance mode 14. The robotic imaging system 10 is configured to image a target site 16. While the camera 12 shown in FIG. 1 is a stereoscopic camera 12, it is understood that other types of cameras may be employed (e.g., those taking a single image). Referring to FIG. 1, the camera 12 is at least partially located in a head unit 18 of a housing assembly 20, with the head unit 18 configured to be at least partially directed towards the target site 16. The camera 12 may be configured to record first and second images of the target site 16, which may be employed to generate a live two-dimensional stereoscopic view of the target site 16. The target site 16 may be an anatomical location on a patient, a laboratory biological sample, calibration slides/templates, etc.

Referring to FIG. 1, the robotic imaging system 10 includes a controller C having at least one processor P and at least one memory M (or non-transitory, tangible computer readable storage medium) on which instructions are recorded for executing method 100, described below with respect to FIG. 2, of operating the collision avoidance mode 14. The memory M can store controller-executable instruction sets, and the processor P can execute the controller-executable instruction sets stored in the memory M.

Referring to FIG. 1, at least one input device 22 ("at least one" omitted henceforth) is operatively connected to the camera 12 (e.g., at the head unit 18) to allow a user to manually position the camera 12. The input device 22 may include respective controls for activating or selecting specific features of the camera 12, such as focus, magnification, adjusting an amount/type of light projected onto the target site 16 and other features. It is understood that the number and form of the input devices 22 may be varied, for example, the input device 22 may include a joystick, wheel, mouse or touchscreen device. In some embodiments, the input device 22 may be controlled via a remote control 66 (see FIG. 1).

Referring to FIG. 1, the robotic imaging system 10 includes a robotic arm 24 operatively connected to and configured to selectively move the head unit 18. The head unit 18 may be mechanically coupled to the robotic arm 24 via a coupling plate 26. The user may position and orient the camera 12 with assistance from the robotic arm 24. Referring to FIG. 1, a sensor 28 is operatively connected to the robotic arm 24 and/or coupling plate 26. The sensor 28 is configured to detect and transmit sensor data related to the position and/or speed of the camera 12. The position of the sensor 28 may be varied based on the application at hand, for example, at an interface between the coupling plate 26 and the camera 12. It is understood that different types of sensor technologies available to those skilled in the art may be utilized for the position/speed-based sensor 28.

The robotic arm 24 includes one or more joints, such as first joint 30 and second joint 32, configured to provide further degrees of positioning and/or orientation of the head unit 18. Referring to FIG. 1, a respective joint motor (such as joint motor 31) and a respective joint sensor (such as joint sensor 33), may be coupled to each joint. The joint motor 31 is configured to rotate the first joint 30 around an axis, while the joint sensor 33 is configured to transmit the position (in 3D space) of the first joint 30.

Referring to FIG. 1, the robotic arm 24 (and/or coupling plate 26) may be controlled via the controller C and/or an integrated processor, such as a robotic arm controller 42. The robotic arm 24 may be selectively operable to extend a viewing range of the camera 12 along an X-axis, a Y-axis and a Z-axis. The robotic arm controller 42 may include a processor, a server, a microcontroller, a workstation, etc. configured to convert one or more messages or instructions from the controller C into messages and/or signals that cause any one of the joints to rotate. The robotic arm controller 42 is also configured to receive and convert sensor information, such as joint position and/or speed from the robotic arm 24 and/or the coupling plate 26 into one or more messages for the controller C. U.S. application Ser. No. 16/398,014 (filed on Apr. 29, 2019), the contents of which is hereby incorporated by reference in its entirety, describes a stereoscopic visualization camera with an integrated robotics platform.

The head unit 18 may be connected to a cart 34 having at least one display medium (which may be a monitor, terminal or other form of two-dimensional visualization), such as first and second displays 36 and 38 shown in FIG. 1. Referring to FIG. 1, the controller C may be configured to process signals for broadcasting on the first and second displays 36 and 38. The housing assembly 20 may be self-contained and movable between various locations. The image stream from the camera 12 may be sent to the controller C and/or a camera processor (not shown), which may be configured to prepare the image stream for viewing. For example, the controller C may combine or interleave first and second video signals from the camera 12 to create a stereoscopic signal. The controller C may be configured to store video and/or stereoscopic video signals into a video file and stored to memory M. The first and second displays 36 and 38 may incorporate a stereoscopic display system, with a two-dimensional display having separate images for the left and right eye respectively. To view the stereoscopic display, a user may wear special glasses that work in conjunction with the first and second displays 36, 38 to show the left view to the user's left eye and the right view to the user's right eye.

Referring to FIG. 1, the first display 36 may be connected to the cart 34 via a flexible mechanical arm 40 with one or more joints to enable flexible positioning. The flexible mechanical arm 40 may be configured to be sufficiently long to extend over a patient during surgery to provide relatively close viewing for a surgeon. The first and second displays 36, 38 may include any type of display, such as a high-definition television, an ultra-high-definition television, smart-eyewear, projectors, one or more computer screens, laptop computers, tablet computers, and/or smartphones and may include a touchscreen.

The camera 12 is configured to acquire images of the target site 16, which may be presented in different forms, including but not limited to, captured still images, real-time images and/or digital video signals. "Real-time" as used herein generally refers to the updating of information at the same rate as data is received. More specifically, "real-time" means that the image data is acquired, processed, and transmitted at a high enough data rate and a low enough delay that when the data is displayed, objects move smoothly without user-noticeable judder or latency. Typically, this occurs when new images are acquired, processed, and transmitted at a rate of at least about 30 frames per second (fps) and displayed at about 60 fps and when the combined processing of the video signal has no more than about $\frac{1}{30}^{th}$ second of delay.

As described below, the collision avoidance mode 14 is velocity-based. The controller C is adapted to compute a single multiplier (referred to herein as trajectory scaling factor) and applying it to the velocity commands (to the robotic arm 24) to slow down robot speeds to a stop as specific limits are approached. The trajectory scaling factor is utilized to avoid self-collisions of the various components, for example, collisions of the camera 12 with the robotic arm 24, collisions of the camera 12 with a storage unit (e.g., cart 34) and collisions of the first joint 30 with the second joint 32.

At each control update of the robotic arm 24, the desired velocity is checked and if it is determined the robotic arm 24 is approaching a limit, a scale-down occurs. The limits can be defined in joint space, Cartesian space or another reference frame. If the robotic arm 24 is not approaching a limit, the trajectory scaling factor is set to 1.0, allowing a quick reversal from a limit. The collision avoidance mode 14 provides relatively smooth motion when entering a region to be avoided. There is no need to "clear" limits in order to exit the restricted region.

Figure 3:
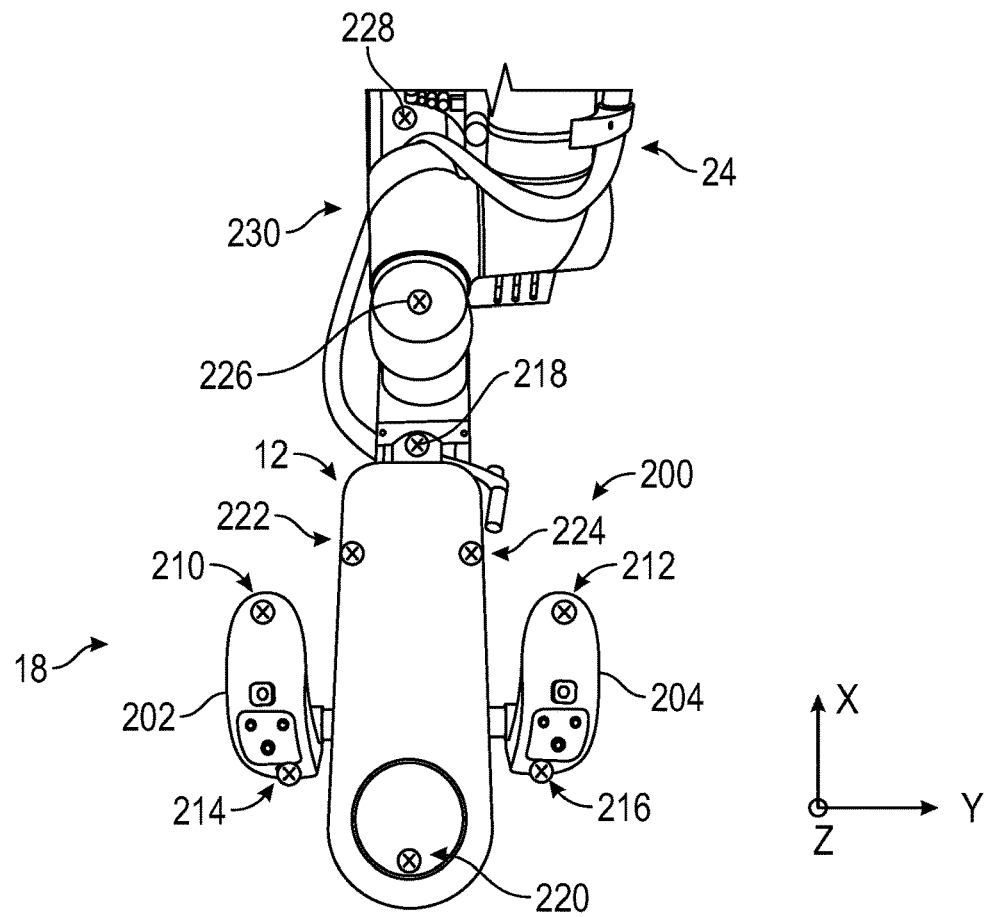
FIG. 3 is a schematic fragmentary top view of the robotic imaging system of FIG. 1, illustrating one or more checkpoints.

The controller C is adapted to calculate the trajectory scaling factor for one or more checkpoints 200 located on the head unit 18, the robotic arm 24, and other places, as shown in FIG. 3. The checkpoints 200 each have a respective position and a respective speed, both along a first direction (e.g., x-direction in FIG. 3). The position and velocity of each of the checkpoints 200 can be calculated with respect to a fixed coordinate frame (for example, either a camera frame or a robot base frame). The fixed coordinate frame may be chosen or varied based on the application at hand. Referring to FIG. 3, The checkpoints 200 may include multiple points on the input device 22, the head unit 18, the coupling plate 26 and the robotic arm 24. Referring to FIG. 3, the input device 22 may include a first handle 202 and a second handle 204. In some embodiments, the input device 22 includes multiple checkpoints such as a first handle top point 210, a first handle bottom point 214, a second handle top point 212 and a second handle bottom point 216. Referring to FIG. 3, the checkpoints 200 may include respective points on the head unit 18, such as a camera proximal point 218, a camera distal point 220, a first side camera mid-point 222, and a second side camera mid-point 224. The set of checkpoints 200 may further include a tool center point 226 and a joint extrusion point 228 in joint 230 of the robotic arm 24.

Figure 4:
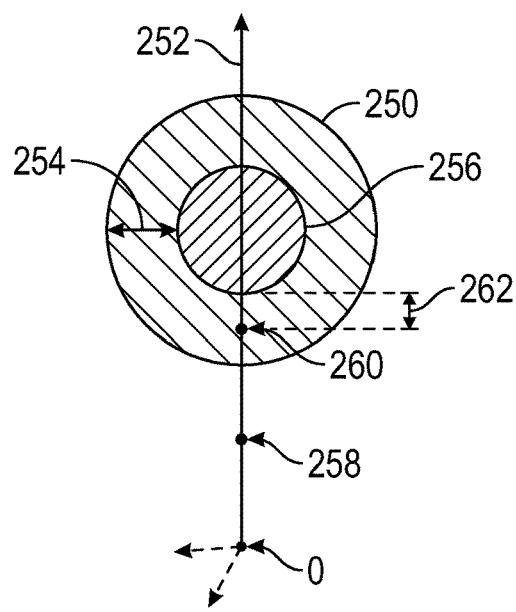
FIG. 4 is a schematic fragmentary diagram showing a buffering distance from a keep-out zone for a checkpoint.

The collision avoidance mode 14 of FIG. 1 is activated when the camera 12 and/or the robotic arm 24 enter a predefined region, such as predefined buffer zone 250 shown in FIG. 4. The trajectory scaling factor is initialized to a normalized value (e.g., 1) when the robotic arm 24 and/or camera 12 is outside of the predefined buffer zone 250. Referring to FIG. 4, the predefined buffer zone 250 is shown with respect to a reference axis 252 extending from an origin O. The predefined buffer zone 250 is within a delta value 254 of at least one "keep-out" region, such as keep-out zone 256. The trajectory scaling prevents motion of the camera 12 and/or robotic arm 24 into the keep-out zone 256, preventing collisions. As an example, the first reference point 258 of FIG. 4 is not in the predefined buffer zone 250, thus no trajectory scaling would be applied. However, the second reference point 260 is within the predefined buffer zone 250 (within a buffering distance 262) and trajectory scaling would be applied.

Figure 2:
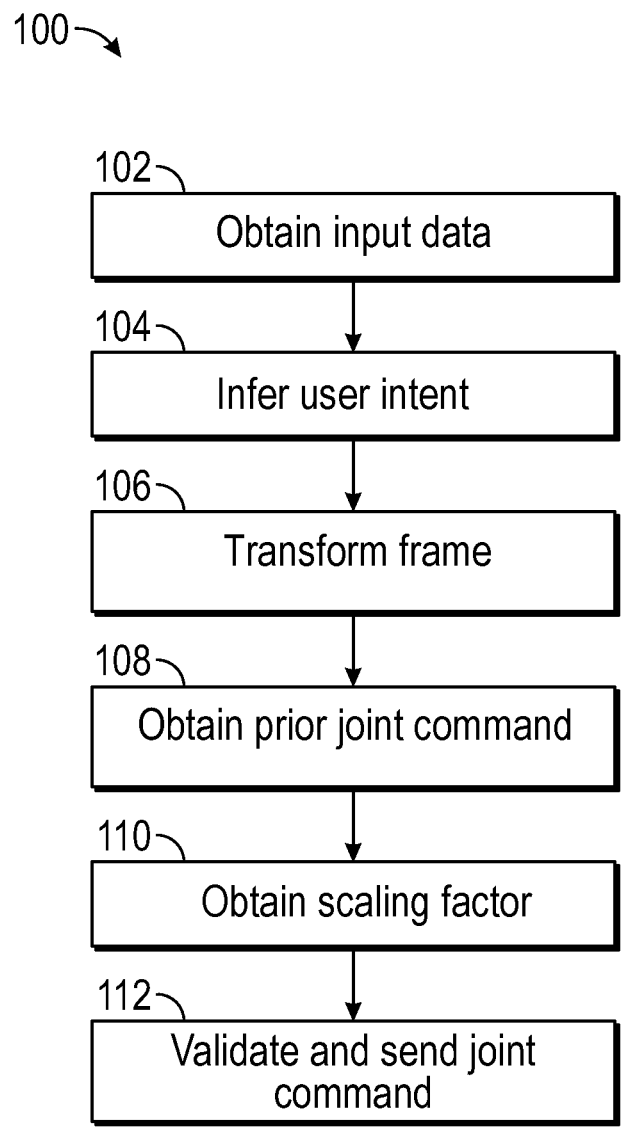
FIG. 2 is a flowchart of an example method for operating the collision avoidance mode.

Referring now to FIG. 2, a flowchart is shown of an example method 100 for operating the collision avoidance mode 14 of FIG. 1. This embodiment is velocity-based and works by modulating the speed of the robotic arm 24. Method 100 may be embodied as computer-readable code or instructions stored on and partially executable by the controller C of FIG. 1. Method 100 need not be applied in the specific order recited herein and may be dynamically executed. Furthermore, it is to be understood that some steps may be eliminated. Method 100 may be executed periodically at predefined time intervals.

Method 100 begins with block 102 of FIG. 2, where the controller C is programmed to receive input data, such as joint position data of the robotic arm 24 and sensor data from the sensor 28 related to the position and/or speed of the various checkpoints 200. Proceeding to block 104 in FIG. 2, the controller C may be programmed to infer user intent, in terms of how the user desires to steer the camera 12. This may be done via a force-based sensor 29 that detects force and/or torque imparted by the user for moving the camera 12. The robotic arm 24 may also include an assisted drive function incorporating a user-guided control system whereby the controller C causes the robotic arm 24 and/or the coupling plate 26 to move the camera 12 in a "power steering" manner, to achieve the user's desired movement.

Advancing to block 106 in FIG. 2, the method 100 includes transforming coordinates from the sensor frame to a robot base frame, which is the coordinate axis on the cart 34 where the base of the robotic arm 24 is mounted. The transformation may include one or more predefined equations or relations based on the position and orientation of the sensor 28. The transformation may be based on parameters obtained via calibration.

Figure 5:
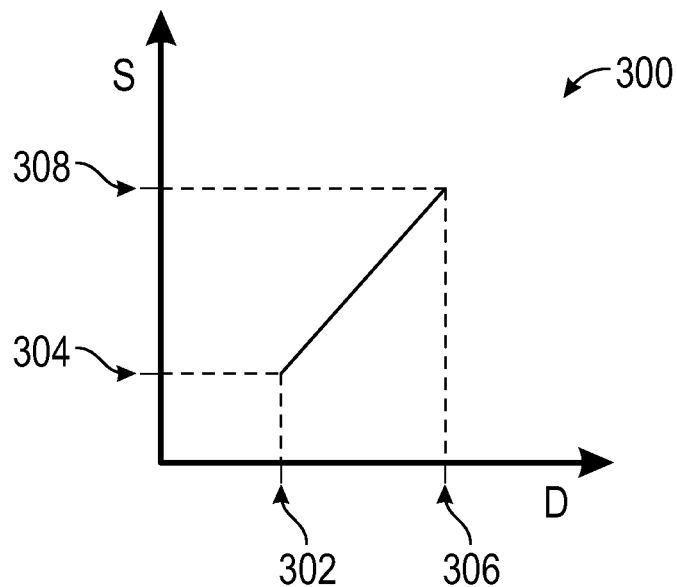
FIG. 5 is a schematic graph of an example scaling curve, showing radius on the horizontal axis and scale on the vertical axis.

Proceeding to block 108 in FIG. 5, the controller C is programmed to obtain the prior joint command (from the preceding cycle). The collision avoidance mode 14 takes in the last and current joint position as inputs, in other words, keeps track of the previous cycle joint coordinates. When using with a velocity command, the current joint positions may be used to approximate the next joint coordinates as follows: the next joint coordinates is approximately the sum of the current joint coordinates and a product of the sample period and the velocity command.

Advancing to block 110 in FIG. 5, the method 100 includes obtaining a plurality of local scales from multiple limit calculations. The local scales are obtained from multiple independent limit calculations each employing respective linear functions raised to a predetermined scale power (V), the scale power being between about 1 and about 2, inclusive. The limit calculations, whether using the distance from one joint to a joint limit or employing a radial distance in Cartesian space, use the same algorithm.

In the embodiment described herein, the method 100 uses three different types of limit calculations: a joint avoidance calculation, a cart avoidance calculation and a boundary plane avoidance calculation. However, it is understood that other types of limit calculations may be employed. With respect to the joint avoidance calculation, the controller C executes it by checking the distance and speed of the respective joint angles of the robotic arm 24 against respective fixed joint angle limits. With respect to the cart avoidance calculation, for a set of checkpoints 200, the controller C checks the respective distance (e.g., radial distance r) and respective speed ($\dot{r}$) of the checkpoints 200 against a surface of the cart 34. The surface of the cart 34 may be modelled as a sphere. With respect to the boundary plane avoidance calculation, the controller C is adapted to check the respective distance and respective speed of the checkpoints 200 against at least one predefined boundary plane 50 (see FIG. 1). The boundary plane 50 may be in proximity to a patient, for example within a clearance distance.

Each of the limit calculations has a set of tunable parameters that govern how quickly the robotic arm 24 decelerates to zero as the respective limit is approached. The set of tunable parameters may include which of the axes to limit and the origin of the limit. Because the joint links are able to move position and change orientation, the checkpoints 200 may collide with them from many different angles. To prevent this, the X-axis, Y-axis, and Z-axis must be selectively constrained. In other words, the tunable parameters have an enabled axis member that sets a respective multiplier for whether the X, Y and Z axes are active. For link boundaries, the origin is presumed to be where the reference frame for a link boundary exists. The set of tunable parameters may include a trigger distance ($D_T$) and a stop distance ($D_S$). The trigger distance 306 ($D_T$) is the distance that the checkpoints 200 should be from a boundary origin (e.g., origin O in FIG. 4) before the movement of the robotic arm 24 is scaled to velocities slower than the maximum allowed velocity at the current user settings. The stop distance 302 ($D_S$) is the fraction of the trigger distance 306 ($D_T$), at which the speed of the robotic arm 24 is scaled down to zero.

A graphical representation of how the local scale is chosen for each of the limit calculations is shown in FIG. 5. Graph 300 in FIG. 5 shows radial distance D on the horizontal axis and a scale factor S on the vertical axis. The controller C is programmed to obtain the scale factor S based in part on the radial distance D, a predefined minimum scale 304 ($S_{min}$), a predefined maximum scale 308 ($S_{max}$), a stop distance 302 ($D_S$) and a trigger distance 306 ($D_T$). The scale factor S for each of the limit calculations is obtained as follows:

$$S = \left[ S_{min} + (D - D_S) * \frac{(S_{max} - S_{min})}{(D_T - D_S)} \right]$$

The local scale ($S^V$) is obtained as the scale factor S raised to a power, referred to herein as scale power V. The scale power is one of the tunable factors governing the process. The higher the value of the scale power V, the more aggressively the collision avoidance mode 14 will scale the speed of the robotic arm 24. The higher the selected value of the scale power, the more aggressively the collision avoidance mode 14 will scale the speed of the robotic arm 24.

Further, per block 110 of FIG. 2, the controller C is programmed to obtain the trajectory scaling factor. The trajectory scaling factor is chosen as a lower one of the normalized value (generally 1.0) and the minimum value of the local scales. For example, Trajectory Scaling Factor=Minimum [1.0, minimum $S^V$ of all the limit calculations]. In another approach, the trajectory scaling factor may be initialized to 1.0, and passed through multiple limit calculations, each using a linear function raised to a scale power V to generate a multiplier from 0 to 1. At each step, the trajectory scaling factor is updated to be the minimum of the current value and the intermediate calculation.

Proceeding to block 112 of FIG. 2, the controller C is programmed to validate the command to scale the trajectory or speed of the robotic arm 24 to ensure that the command (or signal indicative of a command) is within operating parameters (e.g., duration, rotational speed, etc.) of a joint motor. The controller C and/or the robotic arm controller 42 may also validate the+ command by comparing the command to current thresholds to ensure the robotic arm 24 will not draw excess current during any phase of the movement sequence. Lastly, the controller C is programmed to transmit the command via one or more signals to the appropriate joint motor of the robotic arm 24 and/or the coupling plate 26 according to the movement sequence. The transmitted commands cause motors at the respective joints to move the robotic arm 24 and/or the coupling plate 26, thereby causing the camera 12 to move while avoiding collisions. The collision avoidance mode 14 avoids contact that could damage equipment and is computationally very fast.

Orbital Trajectory Correction with Collision Avoidance Mode

Figure 6:
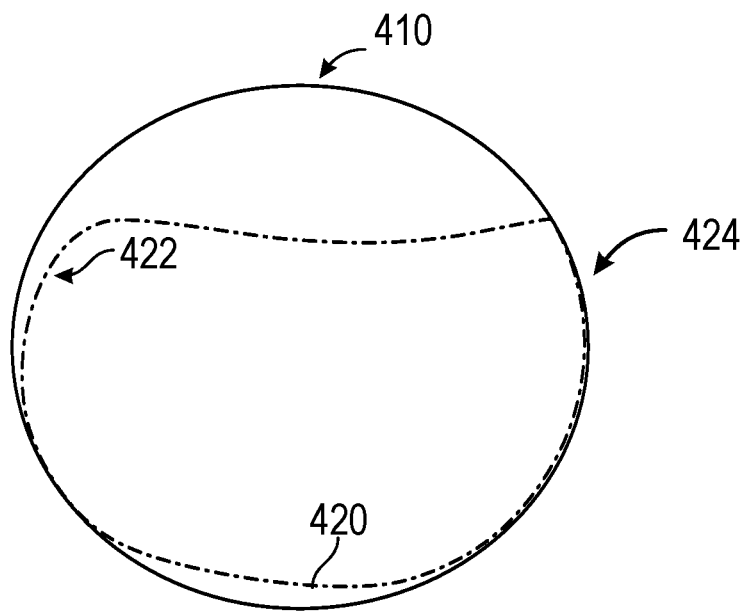
FIG. 6 is a schematic diagram of an orbital trajectory modified by the collision avoidance mode of FIG. 1.
Figure 7:
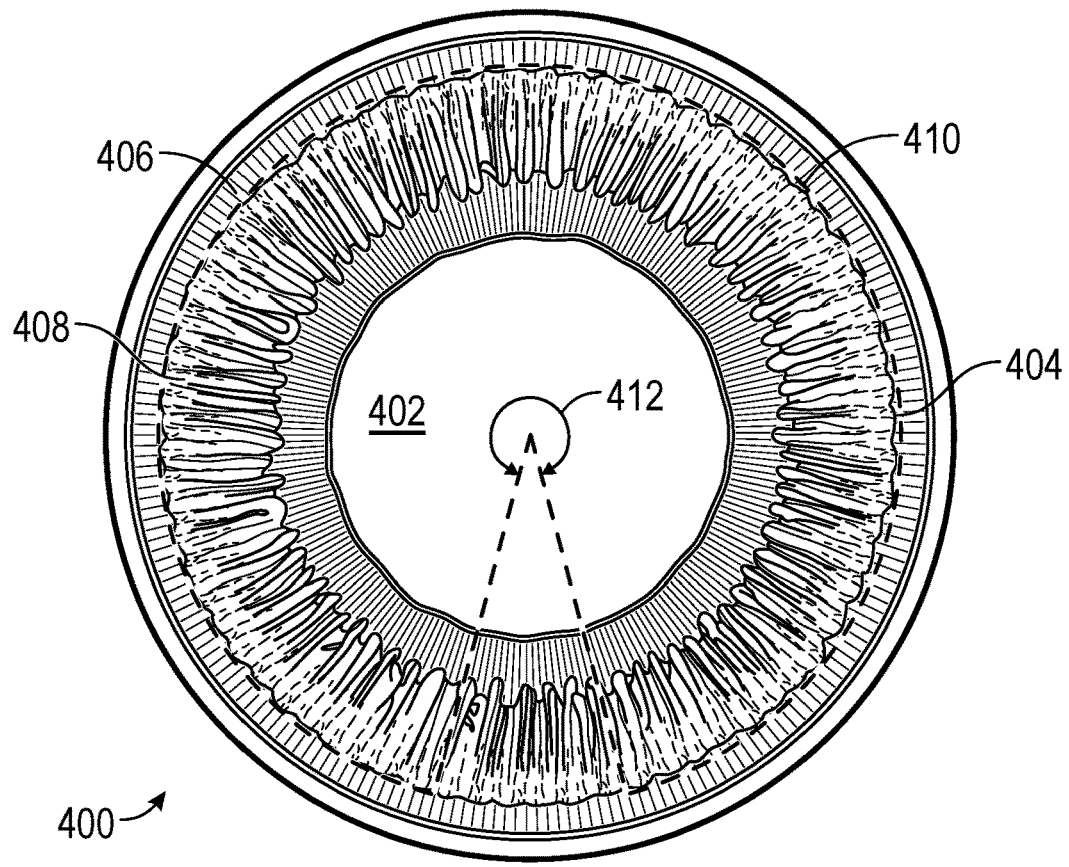
FIG. 7 is a schematic fragmentary sectional diagram of an eye, illustrating an example orbital trajectory performed by the robotic imaging system of FIG. 1.
Figure 8:
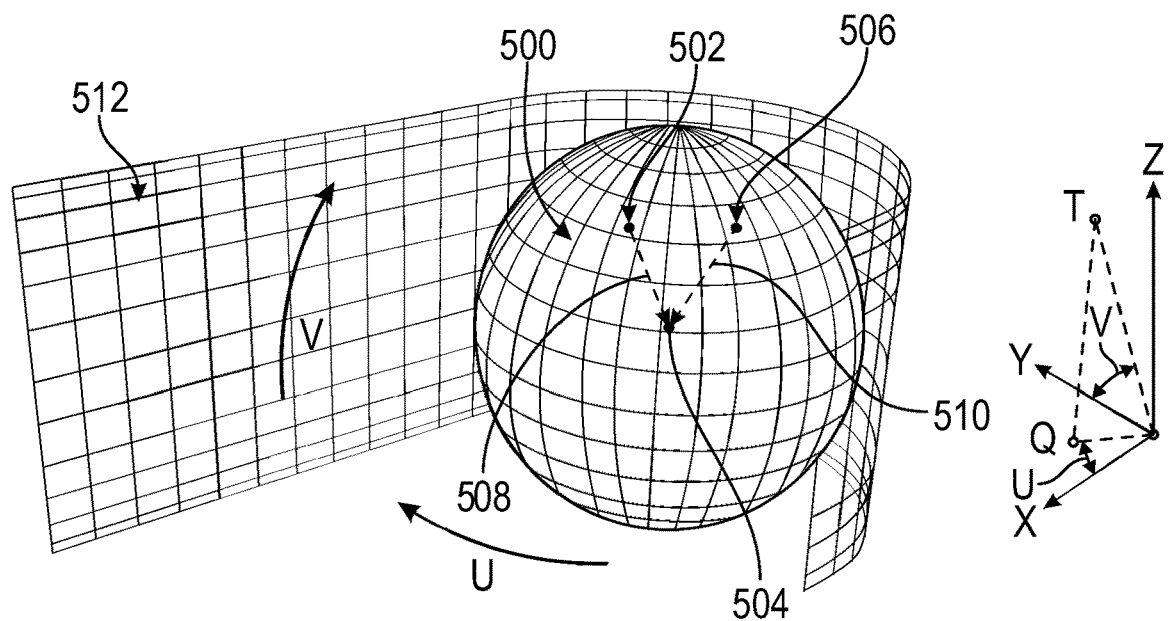
FIG. 8 is a schematic diagram of a virtual sphere employable by the robotic imaging system in performing the orbital trajectory of FIG. 6.

Referring now to FIGS. 6-8, an example implementation of the collision avoidance mode 14 is presented for an orbital scan. In the embodiment shown in FIG. 7, the target site 16 (see FIG. 1) is an eye 400 having a lens 402. The target site 16 includes a portion of the or a *serrata* 404, which is a serrated junction between the retina 406 and the corona *ciliaris* region 408 and defines a transition point between the non-sensory region and the multi-layered sensory region of the eye 400. Referring to FIG. 7, an operator/surgeon may center the robotic imaging system 10 on the eye 400 and move the robotic arm 24 in an orbital trajectory 410 to perform a scan circumferentially around the eye 400. The orbital trajectory 410 may subtend an angle 412 between about 180 degrees and 360 degrees.

Due to workspace and other limitations, the robotic imaging system 10 may be unable to complete a full rotation of the orbital scan. These limitations are typically from joint limits. Many common joint limits are fully elbow extension or compression. Current orbit algorithms may get stuck in joint limits and be unable to complete the designated rotation trajectory, requiring manual user intervention to exit the limit and re-position the camera 12. FIG. 6 is a schematic diagram of an adjusted orbital trajectory 420 modified by the collision avoidance mode 14 and superimposed on the limit-free orbital trajectory 410. As described below, the modifications are based in part on the trajectory scaling factor obtained per method 100 shown in FIG. 2.

The orbital trajectory 410 may be defined in terms of a spherical coordinate system having a first spherical angle (U) and a second spherical angle (V), shown in FIG. 8 for an example location T in XYZ space and its projection Q in the XY plane. The orbital trajectory 410 may be performed by iterating at least one of the first spherical angle (U) and the second spherical angle (V). First, the viewing angle of the orbital trajectory 410 is changed by keeping the first spherical angle (U) fixed (e.g., at 0, 10 degrees or any other angle) and iterating the second spherical angle (V) from $(V+\Delta V)$ to $(V-\Delta V)$ until a desired viewing angle is reached. The desired viewing angle represents the angle required to view the desired portion of the anatomy of the eye and may be pre-programmed into the controller C based on an eye model and/or anatomical data.

Next, the orbital trajectory 410 is achieved by holding the second sphere angle (V) constant at the desired viewing angle, while iterating movement along the first sphere angle (U) of the virtual sphere 500, an example of which is shown in FIG. 8. The controller C and/or the robotic arm controller 42 of FIG. 1 enable an operator to move the camera 12 over the outer surface 502 (see FIG. 8) of the virtual sphere 500 to an end location 506, while keeping the camera 12 pointed at the center 504 (as indicated by view vectors 508, 510). In other embodiments, the virtual sphere 500 may be represented by a different shape and the outer surface 502 may be represented by a planar surface 512.

The controller C may generate the adjusted orbital trajectory 420 by modifying the orbital trajectory 410 by a limiting feedback term and a resetting feedback term $[\Delta R = R_{limit} + R_{reset}]$. The limiting feedback term $(R_{limit})$ may be obtained as: $R_{limit} = [K_{p1}(1.0-SF) - K_{d1}(\dot{SF})]$, such that SF denotes the trajectory scaling factor, $\dot{SF}$ denotes a time derivative of the trajectory scaling factor, $K_{p1}$ denotes a first proportional gain constant and $K_{d1}$ denotes a first derivative gain constant. The resetting feedback term $(R_{reset})$ may be obtained as: $R_{reset} = [K_{p2}(R_0-R) - K_{d2}(\dot{R})]$, such that R denotes the cycle radius, $R_0$ denotes a nominal radius, $\dot{R}$ denotes the time derivative of the cycle radius, $K_{p2}$ denotes a second proportional gain constant and $K_{d2}$ denotes a second derivative gain constant. The first proportional gain constant, first derivative gain constant, second proportional gain constant and second derivative gain constant may be individually tuned and chosen via a calibration process.

When the trajectory scaling factor declines due to proximity to a joint limit, the limiting feedback term reduces the cycle radius (as shown at region 422 of FIG. 6), pulling the robotic arm 24 away from the joint limit and preventing the trajectory scaling factor from reducing to zero. When the trajectory scaling factor converges to one, the resetting feedback term increases the cycle radius (as shown at region 424 of FIG. 6) towards a nominal radius denoting the desired viewing angle. The result of this is that the cycle radius will decrease (see region 422) while near joint limits, and then reset back towards a nominal radius (see region 424) denoting the desired viewing angle when the limit has been cleared. The technical advantage here is that the system can complete many orbital rotations that would otherwise fail or be stuck (without adjustment).

In summary, when performing an orbital trajectory in a scenario where robot joint limits prevent a full rotation of the first spherical angle (U) at the desired viewing angle, the collision avoidance mode 14 may dynamically pull in the cycle radius (as shown at region 422 of FIG. 6) to avoid the joint limits. Referring to FIG. 1, the robotic imaging system 10 may include a low-pass filter 52 selectively executable by the controller C to smooth changes in the second spherical angle (V) in each cycle. The robotic imaging system 10 may include a saturation function 54 selectively executable by the controller C to limit the magnitude of the second spherical angle (V) to be within 0 and 90 degrees in each cycle, inclusive.

The controller C of FIG. 1 may include, or otherwise have access to, information downloaded from remote sources and/or executable programs. Referring to FIG. 1, the controller C may be configured to communicate with a remote server 60 and/or a cloud unit 62, via a network 64. The remote server 60 may be a private or public source of information maintained by an organization, such as for example, a research institute, a company, a university and/or a hospital. The cloud unit 62 may include one or more servers hosted on the Internet to store, manage, and process data.

The network 64 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The network 64 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of connections may be employed.

The controller C of FIG. 1 may be an integral portion of, or a separate module operatively connected to the robotic imaging system 10. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts presented herein illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based devices that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A robotic imaging system comprising:
   a camera configured to record one or more images of a target site;
   a robotic arm operatively connected to the camera, the robotic arm being adapted to selectively move the camera in a movement sequence, the robotic arm including one or more joints;
   a sensor configured to detect and transmit sensor data related to a respective position and/or a respective speed of the camera;
   a controller configured to receive the sensor data, the controller having a processor and tangible, non-transitory memory on which instructions are recorded;
   an orbital scan mode executable by the controller to enable the robotic arm to sweep an orbital trajectory at least partially circumferentially around the target site;
   wherein the controller is adapted to selectively execute a collision avoidance mode based on the sensor data, including:
      determining a trajectory scaling factor for the camera;
      applying the trajectory scaling factor to modulate the respective speed when at least one of the camera and the robotic arm is in a predefined buffer zone; and
      generating an adjusted orbital trajectory based in part on the trajectory scaling factor;
   wherein the controller is adapted to generate the adjusted orbital trajectory from the orbital trajectory via a limiting feedback term and a resetting feedback term; and
   wherein the limiting feedback term causes a cycle radius in the adjusted orbital trajectory to decrease while near a joint limit, and the resetting feedback term causes the cycle radius in the adjusted orbital trajectory to reset back when the joint limit has been cleared.

2. The robotic imaging system of claim 1, wherein:
   the camera is a stereoscopic camera configured to record a left image and a right image for producing at least one stereoscopic image of the target site.

3. The robotic imaging system of claim 1, wherein:
   the predefined buffer zone is within a delta value of at least one keep-out zone, application of the trajectory scaling factor pushing the camera away from the at least one keep-out zone.

4. The robotic imaging system of claim 1, further comprising:
   a head unit for housing the camera;
   a coupling plate mechanically coupling the head unit to the robotic arm, the head unit being operatively connected to a cart; and
   wherein the controller is adapted to calculate the trajectory scaling factor for a set of checkpoints located on the head unit, the robotic arm and/or the coupling plate, the set of checkpoints each having a respective position along a first direction and a respective velocity along the first direction.

5. The robotic imaging system of claim 1, wherein:
   the controller is adapted to initialize the trajectory scaling factor to a normalized value when the robotic arm and/or the camera is outside of the predefined buffer zone, the trajectory scaling factor being based on multiple limit calculations; and the controller is adapted to obtain a minimum value of a plurality of local scales respectively obtained from the multiple limit calculations, the trajectory scaling factor being chosen as a lower one of the normalized value and the minimum value of the plurality of local scales.

6. The robotic imaging system of claim 5, wherein the multiple limit calculations each employ respective linear functions raised to a predetermined scale power between 1 and 2, inclusive.

7. The robotic imaging system of claim 1, wherein:

the robotic arm includes a plurality of joints defining respective joint angles therebetween;

the trajectory scaling factor is based on multiple limit calculations, including a joint avoidance calculation; and the controller is adapted to execute the joint avoidance calculation by checking a distance and speed of the respective joint angles of the robotic arm against respective fixed joint angle limits.

8. The robotic imaging system of claim 1, further comprising:

a cart operatively connected to the camera;

wherein the trajectory scaling factor is based on multiple limit calculations, including a cart avoidance calculation; and wherein the controller is adapted to execute the cart avoidance calculation for a set of checkpoints located on the camera, including checking the respective speed and distance of the set of checkpoints against a surface of the cart.

9. The robotic imaging system of claim 8, wherein the surface of the cart is modelled as a sphere.

10. The robotic imaging system of claim 1, wherein:

the trajectory scaling factor is based on multiple limit calculations, including a boundary plane avoidance calculation; and the controller is adapted to execute the boundary plane avoidance calculation for a set of checkpoints located on the camera, including checking the respective speed and distance of a set of checkpoints against at least one predefined boundary plane.

11. The robotic imaging system of claim 1 wherein the adjusted orbital trajectory is defined by a spherical coordinate axis with a first spherical angle and a second spherical angle.

12. The robotic imaging system of claim 1, wherein the target site includes an or a *serrata* of an eye.

13. The robotic imaging system of claim 11, further comprising:

a low-pass filter selectively executable by the controller to smooth changes in the second spherical angle in each cycle; and a saturation function selectively executable by the controller, the saturation function limiting a magnitude of the second spherical angle to be within 0 and 90 degrees in each cycle, inclusive.

14. The robotic imaging system of claim 11, wherein:

the controller is adapted to change a view angle of the orbital trajectory by keeping the first spherical angle constant while iterating the second spherical angle until a desired viewing angle is reached; and the controller is adapted to selectively command the orbital trajectory by iterating the first spherical angle between a predefined starting angle and a predefined ending angle while the second spherical angle is at the desired viewing angle.

15. The robotic imaging system of claim 11, wherein the limiting feedback term is based on the trajectory scaling factor, a time derivative of the trajectory scaling factor, a first proportional gain constant and a first derivative gain constant.

16. The robotic imaging system of claim 15, wherein:

the limiting feedback term ($R_{limit}$) is obtained as: $R_{limit} = [K_{p1}(1.0-SF) - K_{d1}(\dot{SF})]$, such that SF denotes the trajectory scaling factor, $\dot{SF}$ denotes the time derivative of the trajectory scaling factor, $K_{p1}$ denotes the first proportional gain constant and $K_{d1}$ denotes the first derivative gain constant.

17. The robotic imaging system of claim 11, wherein the resetting feedback term is based on a cycle radius corresponding to the second spherical angle, a time derivative of the cycle radius, a nominal radius corresponding to a desired viewing angle, a second proportional gain constant and a second derivative gain constant.

18. The robotic imaging system of claim 17, wherein:

the resetting feedback term ($R_{reset}$) is obtained as: $R_{reset} = [K_{p2}(R_0-R) - K_{d2}(\dot{R})]$, such that R denotes the cycle radius, $R_0$ denotes the nominal radius, $\dot{R}$ denotes the time derivative of the cycle radius, $K_{p2}$ denotes the second proportional gain constant and $K_{d2}$ denotes the second derivative gain constant.

\* \* \* \* \*